United States Patent [19]
Fernstrom

[11] 3,920,105
[45] Nov. 18, 1975

[54] ELECTRICAL POWER SUPPLY ARRANGEMENT FOR A GUIDED STOCK SELECTOR TRUCK

[75] Inventor: Henry C. Fernstrom, Northbrook, Ill.

[73] Assignee: Barrett Electronics Corporation, Northbrook, Ill.

[22] Filed: Feb. 6, 1974

[21] Appl. No.: 440,255

[52] U.S. Cl. .......... 191/22 R; 214/16.4 B; 219/202; 104/88
[51] Int. Cl.² ........................................ B60M 1/00
[58] Field of Search... 219/202; 214/16.4 A, 16.4 B; 104/88, 242–248; 191/2, 3, 22 R, 29 R, 45 R, 49, 30

[56] References Cited
UNITED STATES PATENTS

| 385,774 | 7/1888 | Roberts | 219/202 |
|---|---|---|---|
| 3,602,379 | 8/1971 | Bosse | 214/16.4 B |
| 3,800,963 | 4/1974 | Holland | 214/16.4 B |

Primary Examiner—Lloyd L. King
Assistant Examiner—D. W. Keen
Attorney, Agent, or Firm—Johnson, Dienner, Emrich & Wagner

[57] ABSTRACT

An electrical power supply arrangement for a guidable stock selector truck for use in low temperature (e.g. −10° F) environments having a storage cart, operator platform, enclosure walls, and heating members. The power arrangement comprises a generally longitudinally elongated guide rail spaced in close proximity to a floor surface and laterally spaced from storage racks by a distance sufficient to accommodate longitudinally extending bus bars surrounded by an insulated guide member and a protected pivotal electrical contactor device connected to the truck having contact birds adapted for continuously engaging and transferring the electrical energy from the bus bars to the truck. Inclined converging lead-ins positioned at ends of the bus bars serve to direct the contact birds to respective contact channel surfaces defined by respective bus bars before the contact birds enter respective contact channels. In a preferred embodiment, the selector truck is provided with an enclosed working area for the platform and within which the heating members allow a selector to be in a more comfortable working temperature.

21 Claims, 7 Drawing Figures

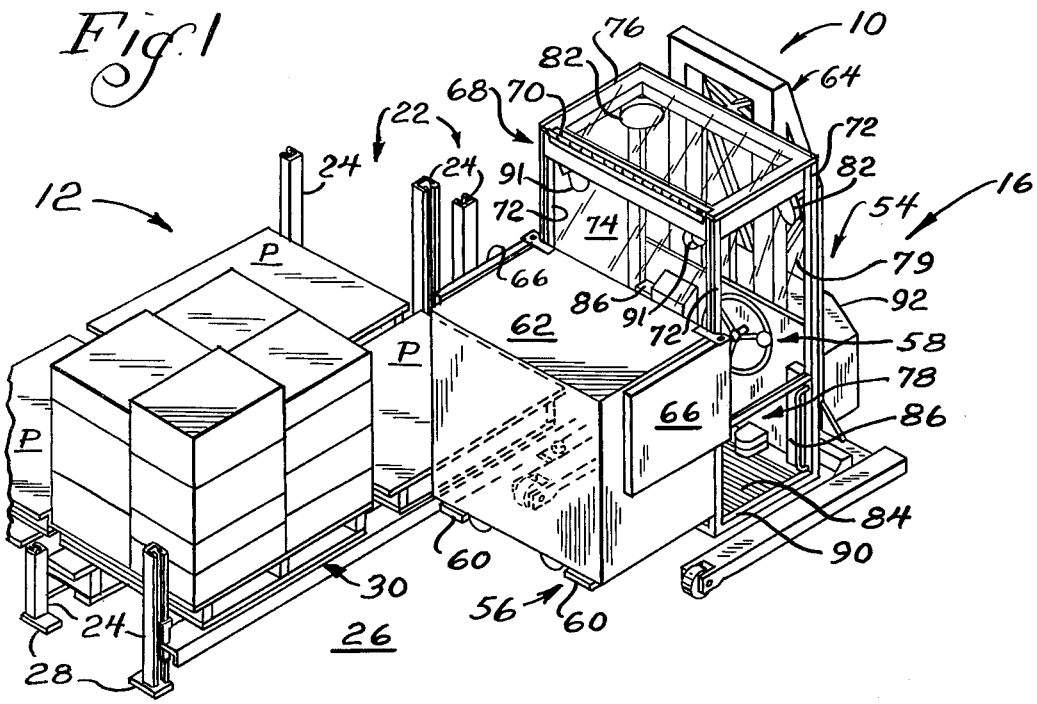
Fig. 1
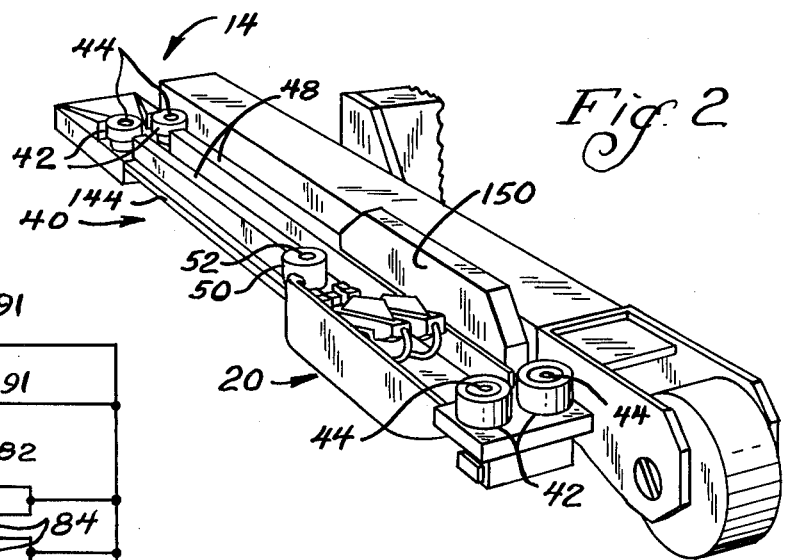
Fig. 2
Fig. 5E

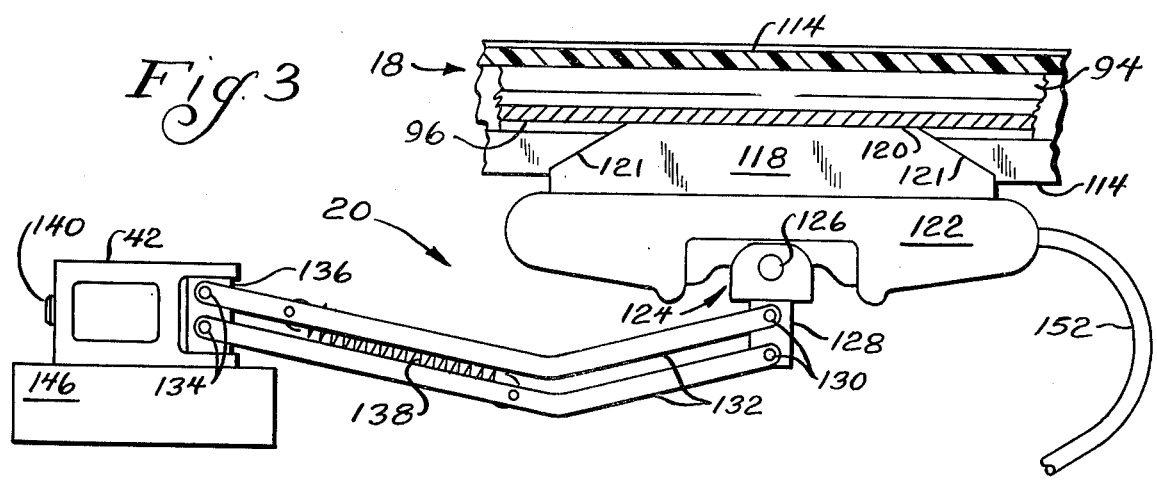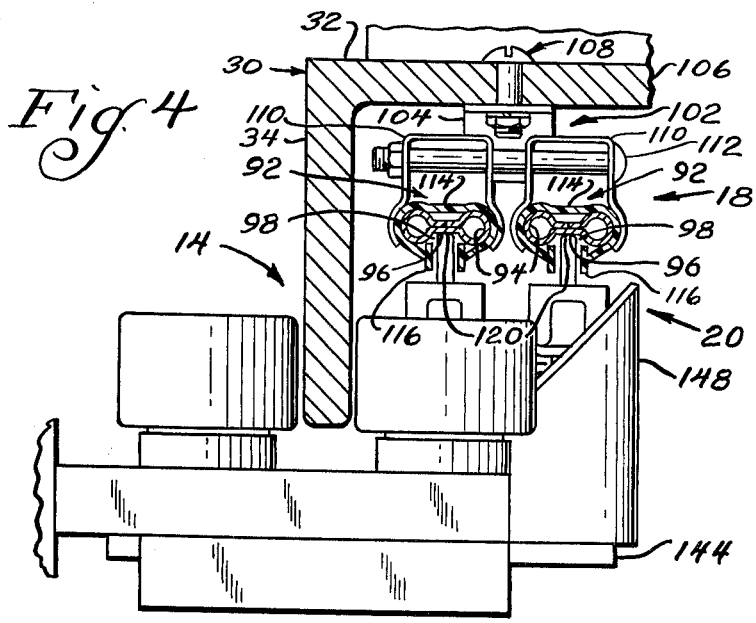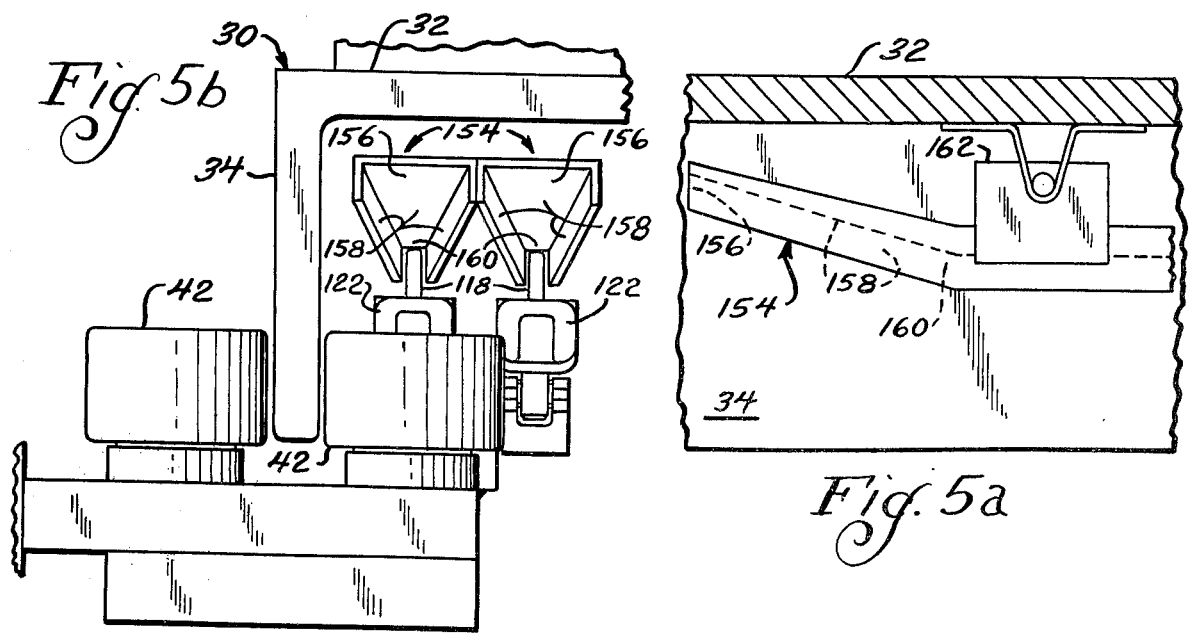

ELECTRICAL POWER SUPPLY ARRANGEMENT FOR A GUIDED STOCK SELECTOR TRUCK

BACKGROUND OF THE INVENTION

1. Field of the Invention

The present invention specifically relates to stock selector trucks employed in the storage and retrieval of frozen food stored in extremely cold storage facilities.

2. Description of the Prior Art

In the storage industry, it is common practice to store temperature sensitive materials, such as frozen foods, at extremely cold temperatures (e.g. minus 10°F). Conventionally, the frozen foods are housed in cartons which are placed upon pallets. The pallets are in turn placed upon storage rack rails by straddle type fork lift trucks maneuverable through aisles defined between or behind the storage racks. The lift trucks normally employ lift forks which are vertically movable to place the pallets upon horizontal pallet supporting rails spaced at varying vertical heights above the floor surface. It is customary to thereafter selectively retrieve ordered quantities of materials from various of the stacked pallets for filling orders by means of stock selector trucks. Some conventional guidable stock selector trucks, such as those similar to Model RCSS manufactured by Barrett Electronics Corporation of Northbrook, Ill., are constructed so as to include pairs of forwardly projecting base legs and vertically movable lift forks. During the retrieval process, the operator of the selector truck stands upon an operator support platform and selects individual cartons from the storage rack and then places them upon a pallet carried by the forks of the selector truck or some other type of container.

While such a form of storage and retrieval process has proven to be efficient and practical, the working conditions (−10°F) are such that employee turnover rate is extremely high even though special wages are paid. In addition, the operators while thus employed will normally work in such an area for only relatively short periods and frequent break periods are common.

Foremost of the contributing factors which have led to the relatively high turnover rate and the relatively short working period is, of course, the extreme cold. Additionally, since the selector truck moves from three to six miles per hour the operator is further exposed to the so-called windchill factor which subjects the operator to a much colder temperature than that set for the frozen food.

Under actual working conditions, a well clothed operator will normally work efficiently for a time span of only about 30 minutes before requiring a break. After a fifteen minute break in a warmer area, the operator returns to the cold storage area and very quickly is again chilled. Thus, during the course of the work day the operator's body is subjected to extremely cold temperatures as well as repeated temperature fluctuations which not only lead to health problems, but also create psychological barriers which hinder performance by the operator. Additionally, the bulky clothing required to withstand the severe temperatures diminishes the operator's mobility. By reason of the above-discussed detrimental effects, employers are frequently unable to maintain an experienced selector truck operator work force which is capable of performing in an efficient and economical manner.

SUMMARY OF THE INVENTION

Accordingly, it is an object of the present invention to overcome such disadvantages and shortcomings by improving the productivity, efficiency, and overall economics of the storage and retrieval process utilized in cold storage environments.

It is another object of the present invention to satisfy existing government OSHA electrical safety standards.

It is another object of the present invention to improve working conditions which presently prevail on guided stock selector trucks employed in extremely cold storage areas by providing a novel and efficient enclosure arrangement which is both heated and wind-resistant, thereby creating a much safer and healthier working environment.

It is another object of the present invention to provide a reliable electrical supply arrangement which insures efficient and continuous transmittal of electrical energy from a power source to a moving stock selector truck so as to energize heating means for the work enclosure.

It is another object of the present invention to prevent damage to the electrical collector or contractor device of the movable stock selector truck caused by impact with nonintended objects during movement of the latter.

In order to accomplish certain of the aforementioned objects, applicant has provided an electrical power arrangement for use in transmitting electrical power from a source of electrical power to a movable stock selector truck used in the storage and retrieval of temperature sensitive materials stored in an extremely cold storage area. Storage racks provided in the storage area have a generally longitudinally elongated guide rail disposed generally parallel to a floor surface and laterally spaced from the rack by a distance sufficient to accommodate preferably two depending and longitudinally extending power lines or electrical bus bars. The guide rail also has a horizontal portion spaced above the floor surface by a distance large enough to accommodate the passage thereunder of selector truck guide means and a pivotal electrical contactor device. The electrical collector or contactor device is mounted so as to protrude outwardly and upwardly from a side of an outrigger or base leg of the stock selector truck so as to contact the electrical bus bars. A support plate mounts the electrical contactor device and has an outwardly and upwardly directed side shield adapted for protecting the electrical contactor device from damage due to its hitting nonintended objects during movement of the stock selector truck. Additionally, at least one rotatable guide wheel is attached to the support plate adjacent the electrical contactor device so as to also aid in preventing against inadvertent impact damage by the guide rail associated with the storage racks.

The electrical contactor includes two contact birds made of conductive material, each having at least one contact surface portion adapted for slidingly engaging a respective bus bar. A pivotal biasing means is connected to each of the contact birds for continuously urging the flat contact surfaces thereof into engagement with their respective bus bars. In event the floor is uneven, the contact birds by being in close proximity to the floor surface are able to reduce stress concentrations between them and the bus bars, which would otherwise normally occur if the bus bars were located at a greater height than contemplated in the present invention.

Each of the bus bars are formed with rounded portions extending along their longitudinal edges and are joined together by a generally flat contact surface area which defines a longitudinally extending depressed channel or path for a respective one of the contact birds. The longitudinally extending depressed channels serve to guide the electrical contact birds as well as to reduce the tendency of the contact birds to be laterally displaced from their predetermined path of movement. A generally C-shaped insulator element includes two curved support portions which partially encompass the respective bus bar rounded portions and have generally vertically extending guide walls terminating at respective ends of each of the said curved support portions. The vertically extending guide walls serve to further guide the contact birds. Bus bar clips secure respective ones of the insulator elements and bus bars to the horizontal plate portion of the guide rail.

In order to insure that the contact birds are properly directed to the channel surfaces formed by the bus bars, each bus bar has provided at opposite ends thereof an inclined, inverted, wide-mouthed lead-in. As the selector truck is traveling from one aisle to another, the contact birds will be properly directed to their respective channels by contact with the inclined inverted lead-ins.

Other objects of the present invention are accomplished by means of the stock selector truck having a novel combination of components. In the preferred embodiment, the combination includes mounting an insulator cart, such as UniCart Model C-110 manufactured by Techno-Truck Mfg. Co., Cleveland, Ohio, which is used in the field to carry frozen foods, upon the forks of the stock selector truck so that the closed doors of the cart face in the direction of the operator's platform thereby being accessible to the selector truck operator. Connected to vertical support columns of the selector truck is a rear wall portion which terminates adjacent the top of the insulator cart to define therewith a rear enclosure wall which serves to resist wind drafts as well as maintain heat in a work enclosure of the truck. A rigid top or overhead wall and a forward wall combine to further define the work enclosure for the operator. Located within the work enclosure are radiant infra red heating source means, which when energized provide radiant heat, for maintaining the work enclosure at a comfortable working temperature. Electrically operated foot-warmers are also provided on the selector truck operator platform for supplying additional heat to the work enclosure. The units as operated in cold storage buildings at −10°F provide a temperature for the operator in the order of 35°F.

These and other objects, features, and advantages of the present invention will become readily apparent upon inspection of the accompanying drawings wherein like reference numerals indicate like structure.

BRIEF DESCRIPTION OF THE DRAWINGS

FIG. 1 is a perspective view of a portion of a storage rack assembly illustrating a preferred embodiment of the stock selector truck made in accordance with the present invention shown in guiding relation with a storage rack;

FIG. 2 is a somewhat enlarged partial perspective view of one of the rearwardly projecting base legs of the stock selector truck illustrating thereon an electrical contactor device forming a component of the electrical power supply arrangement embodying the principles of the present invention;

FIG. 3 is a side elevational view showing in greater detail one of the electrical contactor devices as shown in FIG. 2;

FIG. 4 is an enlarged sectional view illustrating the electrical contactor device as shown in FIG. 2 operatively cooperating with guide rail mounted electrical bus bars made in accordance with the present invention;

FIG. 5a is a side elevational view illustrating one of the inverted inclined tapering channel lead-ins made in accordance with the present invention and shown connected at one end of the elongated bus bar shown in FIG. 4;

FIG. 5b is an end view illustrating a pair of the inverted inclined tapering channel lead-ins as shown in FIG. 5a prior to contact by the electrical contactor device as shown in FIG. 3; and FIG. 5c is a diagram of the system electrical circuit.

DESCRIPTION OF THE PREFERRED EMBODIMENTS

Referring now to FIG. 1 taken in conjunction with FIGS. 2 to 4, there is shown an improved electrical power supply or energy transfer arrangement made in accordance with the principles of the present invention and generally designated by reference numeral 10. The improved electrical transfer arrangement 10 includes a storage rack assembly 12, a guide means 14, a stock selector truck 16, an electrical power source means 18 and a pivotal electrical collector or contactor means 20 for automatically contacting the power source means 18.

It is to be here emphasized that while the improved electrical transfer arrangement 10 of the present invention will be described for use in connection with a storage assembly wherein frozen foods (not shown) are selectively stored and retrieved from an extremely cold storage facility, the scope of the principles of the present invention are intended to encompass other uses thereof.

Turning to the storage rack assembly 12 depicted in FIG. 1, it will be appreciated that the particular embodiment described is but one of several storage rack assembly arrangements the principles of the present invention can be effectively utilized in conjunction with. The illustrated portions of the storage assembly 12 is representative of a relatively large storage area comprised of rows of storage racks, each row being indicated generally at 22. The rows of storage racks 22 can, if desired, be positioned in pairs of two parallel back-to-back rows which define pairs of parallel rows of storage racks and have spaced on either side therefrom aisles for passage therealong by straddle fork lift trucks (not shown) as well as the stock selector truck 16 of the present invention. Vertical support columns 24 are secured in upstanding relation to a floor surface 26 through anchored foot plates 28.

The aligned pairs of vertical columns 24 have horizontal pallet supporting members secured thereto in vertically spaced relation to receive and support loaded pallets P thereon in a known manner. The lowermost of these horizontal pallet supporting members is adjacent each aisle within the storage assembly and also forms a guide rail 30 of the guide means 14. The guide rail angle 30 is spaced vertically above the floor surface 26, for purposes that will be hereinafter described. As perhaps best illustrated in FIG. 4, the guide rail angle 30 includes a horizontal portion 32 joined with a vertical portion 34. The guide rail angle 30 is detachably mounted on the vertical support columns 24 by mounting bracket means 36 (FIG. 1) as set forth in greater detail in U.S. Pat. No. 3,759,403. Other types of mounting brackets can also be effectively used to mount the guide rail angle 30 to the vertical support columns 24 as will be apparent.

The guide means 14 including guide rail angle 30 is used in the manner described in U.S. Pat. No. 3,759,403 to guide the stock selector truck 16 through a corresponding aisle without requiring an operator to steer the stock selector truck. Referring to FIG. 2, guide engaging means 40 of the guide means 14 is shown connected with stock selector truck 16 for guiding the truck along a path predetermined by the guide rail angle 30 as the truck moves along the guide rail angle 30. The guide engaging means 40 on the selector truck 16 comprises in part pairs of forward and rearward rollers 42 aligned and spaced longitudinally apart from each other and are supported for rotational movement about the vertical axes of their respective mounting shafts 44. The guide rollers 42 cooperatively receive the vertical portion 34 of guide rail angle 30 therebetween such that the associated stock selector truck 16 is guided in the predetermined directional path through the aisle and thereby cannot angularly deviate from guide rail angle 30 during movement. Converging lead-ins 46 are also included in guide engaging means 40 and are located outwardly adjacent the rollers 42 and insure proper engagement of the guide rail angle 30 and rollers 42, if there is any misalignment between the latter and the former. Guide engaging means 40 further includes parallel guide bars 48 and intermediate roller 50. The guide bars 48 are desirably aligned and positioned intermediate both the forward and rearward pairs of rollers 42 and are spaced apart from each other by a distance large enough to permit the vertical portion 34 of guide rail angle 30 to pass thereby without contact. However, the guide bars 48 protect against possible impact of the electrical contactor device 20 with the leading end of the guide rail 30. At least one intermediate roller 50 is mounted for rotation about the vertical axis of shaft 52 to also protect the electrical contactor device 20 from any such contact with the guide rail 30.

Again referring to FIG. 1, a preferred embodiment of the stock selector truck 16 is shown as including forward and rearward ends 54 and 56 respectively and intermediate therebetween a work area enclosure 58 which afterwards will be more particularly described. The rearward end 56 is comprised of a pair of outwardly extending load carrying lift forks 60 which are vertically movable and carry thereon an insulator cart 62 for storing temperature sensitive materials. Conventionally constructed and operable lift means, indicated generally at 64, enables vertical movement of lift forks 60. In the embodiment presently being described the insulator cart 62 can be of conventionally known construction, such as said one manufactured by Techno Truck Mfg. Co., Cleveland, Ohio. The insulator cart 62 has a pair of swingable doors 66 which during storage and retrieval operations are normally swung to the open position and abut against the sides of the insulator cart. The doors 66 define a closable opening (not shown) through which the selector truck operator passes the frozen food or other temperature sensitive materials.

In the depicted position, the insulator cart 62 serves to form a portion of a rear enclosure wall generally indicated at 68 of the work enclosure 58. Connected as by hinges at 70 to the rearward end 56 of the upright columns 72 is a detachable rear enclosure wall segment 74 preferably fabricated from a transparent acrylic window. The hinged connection 70 enables the rear wall enclosure segment 74 to be stored on top of an overhead wall of rectangular guard member 76 when not required. Overhead wall member 76 is suitably removably secured in conventional fashion to the top of the upright support columns 72 to define the top wall for the work enclosure 58 which serves to protect the operator from falling objects. A forward enclosure wall portion 78 for the work enclosure 58 can be made of any type of material, such as metal, and has an opening for another acrylic window 79.

The aforesaid arrangement of enclosure walls serve to provide a work enclosure 58 which substantially reduces the detrimental effect of the so-called "wind-chill factor" by protecting against wind currents as the stock selector truck 16 moves through the extremely cold storage environment, retains heat, and protects against falling objects contacting the operator.

Also, as shown in FIGS. 1 and 5, radiant heat source means 80 comprises a pair of infra red radiant heat lamp members 82, a pair of electrically operated footwarmer members 84, and a pair of radiant heater members 86. Associated with each pair of heating members is a thermostat 88 (FIG. 5c) which serves to maintain the work enclosure at a pre-selected comfortable temperature. Heat lamps 82 are suitable connected to the trucks upright column 72 so as to be located at the top of the work enclosure 58 and when energized serve to heat the work enclosure to a comfortable temperature level, so that the selector truck operator can operate more freely without wearing as bulky and constraining clothing as is presently required. The electrically operated footwarmers 84 are suitably connected to a vertically movable operator platform 90 conjointly movable with the lift forks 60 by reason of its connection with the lift means 64. The footwarmers 84 and heaters 86 provides the work enclosure 58 with another source of heat. The infra red heating lamps 82, footwarmers 84, and heaters 86 are of conventional construction and are operable on 110 volts A.C. current. Additional heaters can also be provided at other areas within the enclosure if desired. However, in one embodiment two commercially available infra red lamps rated at 200 W. provided a working temperature for the operator in the order of 35°F when the selector truck was used in a cold storage area which had an ambient temperature of approximately −10°F. Floodlights 91 are also operable by the A.C. current power source to provide light for work enclosure 58. As seen in the schematic diagram illustrating the preferred circuit for the present embodiment, each of the respective pairs of heating members 82, 84 and 86 are connected in parallel, thereby enabling the heating system to operate in event one or more of the heating members is rendered inoperable to perform its intended function.

The operator platform 90 constitutes the bottom enclosure wall of the work enclosure 58 and, as mentioned above, is vertically movable by lift means 64 so as to enable the operator to select cartons of frozen food materials from various levels of pallets P. Located within the work enclosure 58 are a conventional steering wheel, selector truck control box, and a deadman-type service brake floor switch. The forward end 54 of the selector truck 16 is equipped with a suitable power source means (not shown) which normally serves to provide the necessary power for effecting movement of the truck through the freezer.

In the general organization of components as above described, the working enclosure 58 is made relatively wind resistant, by virtue of the enclosing walls 74, 76 and 78. Radiant heat source means 80 within the enclosure 58 when energized, produces a temperature condition, wherein the selector truck operator can comfortably perform his job for substantially an entire working day without requiring numerous breaks.

Referring now to FIGS. 2–4, there is shown in greater detail the electrical power source 18 and electrical contactor device 20 which operate in cooperation with each other for use in providing electrical power for heating purposes in an electric powered order selector truck. In the preferred embodiment, the electrical power source means 18, as perhaps best shown in FIG. 4, is comprised of two generally parallel and longitudinally extending bus bars 92 such as of the type manufactured by and commercially available from Insul-8-Corporation, of San Carlos, Calif., which are connected to the underneath portion of the horizontal portion 32 by fastening means 102 located at spaced intervals along the guide rail angle 30. Each bus bar 92 extends coextensively along the longitudinal extent of the guide rail angle 32 and each carries 110 volts A.C. current. The bus bars 92 can be made of any conventional conductive material and, if desired, from a single piece thereof. Each bus bar 92 has generally rounded portions 94 extending along the longitudinal edges thereof. Preferably, but not necessarily, the rounded portions can be tubular for purposes of reducing the expense and weight of the bus bars 92. A generally flat contact surface 96 interconnects both rounded portions 94, preferably at their midpoints, and defines a depressed contact channel 98 within which the electrical contactor means 20, to be afterwards described, will make contact with contact surface 96 for transferring the electrical energy to the selector truck 16. The channel 98 serves to guide the contactor means 20 and inhibit lateral movement thereof. The guide rail angle 30 is grounded by means (not shown) located at spaced intervals along the longitudinal extent of the guide rail angle 30.

The fastening means 102 includes a bracket 104 secured to the underneath surface 106 of horizontal portion 32 by conventional nut and bolt means 108. Generally U-shaped bus bar clips 110 are mounted upon a bus bar locking bolt 112 which extends through air openings (not shown) in the clips and bracket 104. The bus bar clips 110 are conventional and encompass the curved portions of a generally C-shaped insulator element 114 made from a suitable plastic insulating material, such as the type manufactured by the above-identified Insul-8-Corporation. The insulator 114 extends along the entire length of bus bars 92 and at the ends of its curved portions are generally vertically arranged guide walls 116 which serve to aid in guiding the electrical contactor means 20 in a manner which will become subsequently apparent.

The height of the bus bars 92 from the ground surface 26 is so selected that it will enable passage of the contactor means 20 under and in engagement with the underside of the bus bars 92. In normal working conditions, the bus bars 92 will be spaced less than eight inches above the ground surface. Consequently, considering the protective function of the vertical guide rail portion 34, the bus bars 92 are relatively inaccessible to humans or mechanical parts of the selector truck other than the contactor means 20. Moreover, the bus bars are connected to the power source so that 110 volt power is derived from the bus bar only by simultaneous contact with both bus bars. This aforedescribed arrangement satisfies OSHA requirements for a safe electrical power supply arrangement.

Referring to FIG. 3 taken in conjunction with FIG. 4, there is shown in somewhat greater detail the electrical contactor means 20 which is of a known construction and commercially available from the aforesaid Insul-8-Corporation. Accordingly, only those portions necessary for an understanding of the present invention will be discussed. Two generally parallel pivotal contact birds or brushes 118 are made of a resilient conductive material, such as copper. Each contact bird 118 has at least one generally flat contact surface 120 for engaging a contact portion 96 defined by the bus bars 92 and chamfered ends 121. Each contact bird 114 is suitably secured to an insulated pivotal shoe member 122 made of any appropriate electrical insulating material. The shoe members 122 have openings which receive and suitably secure the upwardly protruding contact birds 118.

As shown more clearly in FIG. 3, a yoke post assembly 124, made of an electrical insulating material, is pivotally connected at 126 to a contact bird 118. Depending projection 128 of the yoke post assembly 124 is pivotally connected as at 130 to ends of a pair of upper and lower pivot arms 132. The pivot arms 132 have their opposite ends pivotally connected as at 134 to a slidable base post 136. The post 136 is able to rotate about a vertical axis (not shown) so as to permit lateral movement of the contact bird 118. A compression spring 138 is connected between the upper and lower pivot arms 132, respectively.

By virtue of the above arrangement, the contact birds 118 are continuously pivotally yieldingly biased upwardly due to the biasing force exerted by the spring 138. In this manner, the contact birds 118 are continually urged into engagement with the contact channel surface 96 of the bus bars 92, thereby compensating for any unevenness in the floor surface 26 that might otherwise cause interruption of the contact therebetween. Additionally, by having the contact birds 118 in close proximity to floor surface 26, if in event the latter is uneven, the detrimental stress concentrations which would otherwise normally occur between the contact birds and bus bars 92, if the contact birds were to extend upwardly a greater distance (e.g. to the ceiling) than they presently do, would be eliminated. Thusly, a more durable and trouble free connection is obtained.

Set screw 140 connects housing 143 for slidable base post 136 to support platform 144 (See FIG. 2) by threadedly cooperating with support member 146 (See FIG. 3). The support platform 144 has an upstanding curved protective shield wall member 148 (FIGS. 2 and 4) fixedly supported at its outer periphery to protect the electrical contactor means 20 from inadvertent contact with other objects in movement of the selector truck 16 along its selected route. A second vertically extending protective wall 150 (FIG. 2) is positioned opposite shield wall 148. Extending forwardly from each pivotal shoe 122 is an insulated cable 152 which is appropriately connected to the electrical system of the selector truck so as to transfer the electricity from the bus bars 92 to the heating elements 82, 84, and 86 in the work enclosure area 58.

Referring now to FIGS. 5a and 5b there is shown inverted inclined channel lead-in members 154. The lead-ins 154 are inclined so that a wide-mouth portion 156 faces upwardly and outwardly. Since the contact birds 118 when not in the engaging position are at a greater height relative to the ground surface 26 by reason of the upwardly biased pivot arms 132, the inverted lead-ins 154 are respectively inclined so that the mouth portions 156 are situated above the extended position (not shown) of the contact birds 118. Guide walls 158 convergingly taper toward a narrower exit portion 160 and function to direct the contact birds 118 into proper alignment and engagement with contact channel surfaces 96 of the bus bars 92 as the contact birds 118 are entering a new row of storage racks 22. To this end the lead-ins 154 are desirably located at opposite ends of each bus bar 92. This latter arrangement is very useful whenever the stock selector truck 16 is cornering from one aisle to another. Lead-in members 154 are suitably fastened to the horizontal portion 32 by a conventional bracket device 162.

The electrical transfer arrangement 10 described above operates in the following manner. When the stock selector truck 16 with the outwardly projecting base legs turns into an aisle parallel to a row of racks 22 the converging lead-ins 46 of the guide means 14 insures proper engagement of forward guide rollers 42 with the guide rail vertical portion 32 should slight misalignment exist therebetween. The parallel guide bars 48 prevent the stock selector truck 16 from deviating in a direction which would cause the forward end of the guide rail 30 to impact against any one of the rearward rollers 42, and more importantly the contactor means 20. Intermediate roller 50 provides further protection by preventing impact of the front end of guide rail angle 30 with the contactor means 20. During turning of the selector truck 16, the protective shield 148 additionally serves to protect the contactor means 20 from any impact with non-intended objects. Inverted inclined channel lead-ins 154, as mentioned above, assist in properly guiding the contact birds 118 into the longitudinal channels 98 and contact engagement with channel surface portions 96. As is conventional, the chamfered ends 121 of contact birds 118 assist in providing a relatively smooth entry of the birds into the bus bar members 92. When contact between bus bars 92 and biased contact birds 118 is effected, electrical energy carried by the bus bars is transferred to the electrical heating means 80 for the enclosed area 58 of the truck 16.

The depressed channels 98 serve to not only provide longitudinally extending guides for contact birds 118 but also tend to inhibit lateral movement of the latter. Additionally, guide walls 116 also aid in inhibiting lateral movement of contact birds 118. If floor surface 26 has depressions therein, which have a tendency to interrupt contact between the contact birds 118 and contact surfaces 96, the upwardly biasing force provided by the pivotal arms 132 and spring 138 compensate for the depressions by continually upwardly forcing the birds 118 into engagement with the contact surfaces 96. On the other hand, if there are any projections on floor surface 26 which would have a tendency to unduly force the contact birds 118 into engagement with the contact surfaces 96, the pivotal arrangement of the pivot arms 132 will enable the pivot arms to move downwardly, thereby avoiding the application of undesirable stresses to the contact birds and pivot arms. Further, as mentioned above, the arrangement whereby both the contact birds and bus bars are positioned close to the ground substantially eliminates undesired stresses therebetween, should the truck travel over an uneven surfaced floor.

The electrical power supplied is sufficient to enable the infra red heat lamps 82, footwarmers 84, heaters 86, and lights 91 to be energized, thereby providing adequate heat to work enclosure 58. As a result of the aforementioned wall enclosures 74, 76 and 78, heat will be better retained and the wind chill factor normally experienced with movement of the stock selector truck 16 through the extremely cold environment of the storage facility is substantially reduced, if not eliminated.

With the use of the novel equipment in the field, it has been found that the stock selector truck operator is now able to work in the cold storage area for longer periods of time with less bulky clothing and without experiencing the harsh, unpleasant working conditions previously common to such line of work. In addition to improved and healthier working conditions for the employees, such arrangement has been found to result in increased productivity and a more efficient storage and retrieval operation.

While the particular embodiments of the present invention have been shown and described, it will be obvious to those skilled in the art that changes and modifications may be made without departing from this invention and its broader aspects and therefore, the aim in the appended claims is to cover all such changes and modifications as fall within the scope of this invention.

1. In a stock selector truck adapted for use in retrieving temperature sensitive materials from a cold storage area comprising, in combination, a vertically movable operator platform, load carrying means movable conjointly with said platform, lift means for enabling vertical movement of both said load carrying means and said platform, a work area on said platform having a first wall, an insulated storage cart removably carried by said load carrying means and defining a portion of a second wall for said work area, said storage cart having an opening which is accessible to an operator of said selector truck from said work area, thereby permitting the operator to conveniently store the selected temperature sensitive material in said cart as said selector truck moves adjacent storage racks which store said material, heating means located within said working area, and an electrical contactor means on said selector truck for automatically engaging an electrical power source which extends along the path of travel for said selector truck to energize said heating means.

2. A selector truck as defined in claim 1, wherein said heating means includes at least one infra red heating lamp located adjacent a top portion of said work area for supplying heat thereto.

3. A stock selector truck as defined in claim 1 wherein said heating means includes at least one foot warmer mounted on and supported by said operator platform.

4. A selector truck as defined in claim 1 wherein said heating means further includes at least one heating element supported and located within said work area.

5. A selector truck as defined in claim 1 which further includes an overhead wall for said work area and a transparent panel interposed between an upper surface of said storage cart and said overhead wall defining a further portion of said second wall.

6. In a guidance system for a stock selector truck including guide means for automatically determining the route of travel for said stock selector truck relative to a storage rack, said guide means including a guide rail disposed generally parallel to a floor surface, and guide rail engaging means provided on said truck for engagement with said guide rail to guide said truck along the route predetermined by said guide rail, and electrical power distribution means including bus bar means secured to said guide rail and insulated therefrom, said bus bar means being connected to a source of electrical power and extending coextensively along said route with said guide rail, and electrical contactor means mounted on said guide rail engaging means for said truck, and having electrical contact means insulated from said guide rail engaging means and contacting said bus bar means, and electrical power utilization means carried by said truck, said power utilization means being connected to said contact means whereby electrical power is transferred to said power utilization means from said power source as said truck moves along the path determined by said guide rail.

7. In a guidance system which includes, in combination, guide means for automatically determining the route of travel for a stock selector truck used in conjunction with a storage rack including a guide rail disposed generally parallel to a floor surface, said guide rail having a horizontal portion and a vertical portion which depends downwardly from said horizontal portion, and guide rail engaging means provided on said truck for engagement with said guide rail to guide said truck along the route predetermined by said guide rail, electrical power means mounted beneath said horizontal portion of said guide rail connected to a source of electrical power and extending along said route with said guide rail, said electrical power means being protected from contact with said truck by said vertical portion of said guide rail, electrical power utilization means carried by said truck, and electrical contactor means on said truck for automatically contacting said electrical power means thereby transferring electrical power to said power utilization means as said truck moves along the path determined by said guide rail.

8. A guidance system as defined in claim 7 in which said electrical contactor means includes contact means for engaging said electrical power means whenever said truck is moved into a position for guidance by said guide rail, means for pivotally supporting said contact means, and bias means for providing a biasing force which urges said contact means into engagement with said electrical power means.

9. A guidance system as defined in claim 8 wherein said guide rail engaging means includes a plurality of pairs of guide rollers, the rollers of each of said pair of rollers being spaced apart in rolling engagement with opposite sides of said vertical portion of said guide rail whenever said truck is moved into position for guidance by said guide rail.

10. A guidance system as defined in claim 8 wherein said electrical power means includes a pair of generally longitudinally extending bus bars which carry electrical power, each of said bus bars have a longitudinally extending depressed contact channel for guiding said contact means in a manner which minimizes lateral movement thereof and which defines a generally flat channel surface for engagement with said contact means.

11. A guidance arrangement as defined in claim 8 which further includes a guide wheel supported adjacent said bias means for preventing damage to said contact means from said vertical portion of said guide rail.

12. A guidance system as defined in claim 8 wherein said electrical contactor means further includes support means which project laterally outwardly from said truck, said support means including at least one upwardly directed protection wall secured at an end thereof for protecting said contact means from contact with other objects whenever said truck is moving along said guide rail.

13. A guidance system as defined in claim 8 which further includes direction means connected to said guide rail adjacent one end of said electrical power means for directing said contact means toward and into engagement with said electrical power means whenever said guide engaging means on said truck is moved into engagement with said vertical portion of said guide rail.

14. A guidance system as defined in claim 13 wherein said electical power means includes at least one channel surface and said direction means includes at least one inverted inclined channel member aligned with said channel surface of said electrical power means, said channel member having guide walls which convergingly taper toward said channel surface for leading-in said contact means toward and into engagement with said contact channel.

15. A guidance system as defined in claim 8 wherein said truck includes a base leg and said electrical contactor means includes support means laterally projecting from said base leg for supporting said contact means, said guide engaging means including a plurality of rollers longitudinally aligned in pairs, the rollers of each of said pairs of rollers being spaced apart by a distance sufficient to accommodate said vertical portion of said guide rail thereby enabling said truck to be guided along a predetermined course defined by said guide rail, said contact means being arranged intermediate longitudinally aligned ones of said pairs of rollers to protect against inadvertent contact with the vertical portions of said guide rail.

16. A guidance system as defined in claim 15 wherein said support means includes a pair of vertically extending protection walls both of which straddle said contact means, and a protection guide wheel mounted for rotation on said support means and located adjacent one end of said contact means for protecting said contact means from contact with said vertical portion.

17. A guidance system as defined in claim 15 wherein said guide engaging means further includes a pair of guide bars which extend longitudinally along a portion of the distance between said longitudinally aligned and spaced pairs of rollers, and a pair of lead-in members are supported by said support means adjacent one of said pairs of rollers remote from said contact means.

18. A guidance system as set forth in claim 7 wherein said stock selector truck is adapted for use in retrieving temperature sensitive materials from a cold storage area and wherein said power utilization means includes at least one heating means located within a working area of said selector truck.

19. A guidance system as defined in claim 7 wherein said truck includes a vertically movable operator platform, load carrying means movable conjointly with said platform, lift means for enabling vertical movement of both said load carrying means and said platform, a work area on said platform having at least a first wall, and an insulated storage cart removably carried by said load carrying means to define a portion of a second wall and having an opening which is accessible to the operator from said work area, thereby permitting the operator to conveniently store temperature sensitive materials selected from the racks in said insulated cart as said truck moves adjacent the storage racks.

20. In a stock selector truck adapted for use in retrieving temperature sensitive materials stored on storage racks within a freezer area the combination comprising a vertically movable operator platform, load carrying means movable conjointly with said platform, lift means for enabling vertical movement of both said load carrying means and said platform, a selectively heated and wind resistant work enclosure supported on said operator platform, an insulated storage cart having an opening facing said work enclosure for permitting an operator of said selector truck to conveniently store selected temperature sensitive materials in said storage cart, said work enclosure including a frame, a first panel connected to said frame defining a top enclosure wall for said work enclosure, a second panel connected to said frame and interposed between said first panel and an upper surface of said storage cart for defining a portion of a rearward enclosure wall for said work enclosure, and a third panel having a transparent portion connected to said frame defining a forward enclosure wall for said work enclosure, electrical radiant infrared heating means located within said work enclosure, and electrical contactor means carried by said truck for engaging an electrical power distribution source which extends along the route of travel of said truck to energize said heating means.

21. In a stock selector truck for movement along a guide rail assembled to define a path which extends along storage racks which store frozen foods at different levels, guide rail engaging means on said selector truck for engaging said guide rail to enable said truck to follow a predetermined route determined by said guide rail, an electrical power means extending coextensively with said guide rail, and electrical contactor means mounted on said guide rail engaging means for said truck for engaging said electrical power means, and heating means carried by said truck, said heating means being connected to said contactor means whereby electrical power is transferred to said heating means as said selector truck moves along said guide rail.

* * * * *